United States Patent [19]

Kublick

[11] 4,328,429
[45] May 4, 1982

[54] METHOD AND APPARATUS FOR CONTROLLING INVERTERS IN PARALLEL OPERATION

[75] Inventor: Christian Kublick, Erlangen, Fed. Rep. of Germany

[73] Assignee: Siemens Aktiengesellschaft, Munich, Fed. Rep. of Germany

[21] Appl. No.: 117,081

[22] Filed: Jan. 31, 1980

[30] Foreign Application Priority Data

Feb. 8, 1979 [DE] Fed. Rep. of Germany ....... 2904786

[51] Int. Cl.³ .............................................. H02N 3/46
[52] U.S. Cl. ...................................... 307/58; 307/82; 307/87
[58] Field of Search ..................... 307/82, 87, 58, 151; 363/36, 79; 323/20, 67, 106

[56] References Cited

U.S. PATENT DOCUMENTS 3,864,620  2/1975  Abbondanti ..................... 307/58 X

OTHER PUBLICATIONS

"Interruption-Free Power Supply with Inverters", Siemens-Zeitschrift 47 (1973), No. 2, pp. 123–126.
Publication 536, "Redundant Synchronization of Static Power Supply Installations", Jul. 1975, of AG fuer Industrielle Elecktromi, Losone-Lo Carno, pp. 3–7.

Primary Examiner—L. T. Hix
Assistant Examiner—S. D. Schreyer
Attorney, Agent, or Firm—Kenyon & Kenyon

[57] ABSTRACT

A method for controlling the voltage and the load distribution, as well as for synchronizing, of several inverters the outputs of which can be connected to a common bus bar in which, for each inverter, a simulated control variable is formed and is compared as to amplitude and phase with a reference voltage which is the same for all inverters.

22 Claims, 5 Drawing Figures

METHOD AND APPARATUS FOR CONTROLLING INVERTERS IN PARALLEL OPERATION

BACKGROUND OF THE INVENTION

This invention relates to a method and apparatus for controlling the voltage and load distribution as well as for synchronizing several inverters, the outputs of which can be connected to a common bus bar.

Such a method is known, for instance, from the paper "Interruption-free Power Supply with Inverters", Siemens-Zeitschrift 47 (1973); no. 2, pages 123 to 126. In this reference, problems arising in connecting inverters in parallel are discussed in conjunction with interruption-free power supplies, but similar problems also arise in other applications of parallel connected inverters, for instance, in emergency power supplies or converters.

The public power supply system is not always suitable for supplying sensitive consumers, since its availability within narrow tolerances, particularly with respect to voltage amplitude, is not always assured. Thus, the operation of data processing installations, for instance, can be disturbed by brief interruptions of a few 100 msec duration. To circumvent these difficulties, sensitive consumers are supplied in an interruption free manner via static converters in conjunction with an energy source which is independent of the supply network. This source is generally a battery which is charged by a controlled rectifier from the public power supply system. An inverter then supplies the sensitive a-c loads. To increase reliability, several inverters are often connected in parallel via a bus bar, resulting in a redundant design. Then, provisions must be made to keep the frequency and the voltage constant; the inverters must be synchronized with each other and the load must be distributed as uniformly as possible over all parallel operated systems. These conditions must be met for a number of operating conditions, i.e., not only in normal operation with all inverters in parallel, but also, for instance, if an individual inverter fails, and for operation with network reconnection.

The problems described arise in a similar manner also with parallel connected static converters and with emergency power supplies comprising several parallel connected inverters.

From the above-mentioned paper "Interruption-free Power Supply with Inverters", Siemens-Zeitschrift 47 (1973), no. 2, pages 123 to 126, a control device for parallel connected inverters is known, in which each inverter has a synchronizing device which determines the phase of the inverter assigned to it and compares it with the phase of the other inverters. To distribute the load in a defined manner, a control is provided which carries out a corresponding load transfer from the operating data of the parallel operating inverters via the magnitude setting input for the voltage of the inverter. In addition, a voltage control for the inverter must be provided. To adapt the inverter to different operating conditions, extensive intervention into the control apparatus must be made, which can lead to control oscillations when switching operating conditions.

From the publication 536, "Redundant Synchronization of Static Power Supply Installations" of July, 1975, of AG fuer industrielle Elektronik, Losone-Locarno, pages 3 to 7, bus bars of parallel connected inverters can be used as a synchronization line. The use of the bus bar for synchronizing, however, is called disadvantageous and is not discussed further.

SUMMARY OF THE INVENTION

It is an object of the present invention to describe a method and apparatus for controlling inverters that can be connected in parallel, in which for controlling the voltage and the load distribution as well as the synchronization, only one control variable for each inverter is necessary, and in which switching only the reference value is necessary for adaption to different operating conditions.

According to the present invention, this problem is solved by forming, for each inverter, a simulated control variable $U_{Wi}' = U_{Wi} + \Delta I_i \cdot Z_{xi}$, and, for controlling each inverter, comparing the magnitude and phase of the simulated control variable with a reference voltage which is equal for all inverters, where $U_{Wi}$ is the output voltage of the inverter, $\Delta I_i$ the deviation of the output current $I_{Wi}$ of the inverter from the reference value $I_{soll\ i}$, and $Z_{xi}$ is a complex impedance.

With the simulated control variables chosen in this manner, it is possible to obtain the predetermined load distribution among the inverters, to hold the output voltage of the inverters at a reference value to synchronize the inverters among each other. The simulated control variable is applicable for all operating conditions occurring in practice, so that when switching between operating conditions, only the reference voltage needs to be changed. The simulated control variable can be formed by simple circuitry means.

It is advantageous to choose the real and the imaginary component of the complex impedance so that they are proportional to the real and the imaginary component of the internal impedance of the inverter. An optimum control characteristic is thereby achieved.

In a method for controlling several inverters with separate phase and amplitude channels, where the reference voltage is split into an amplitude and a phase reference voltage, the phase and the amplitude of the simulated variable can be compared for each inverter in a separate phase control channel with the phase reference voltage and in an amplitude control channel with the amplitude reference voltage. This splitting of the control into two channels provides a simplification. In addition, most control units of inverters have separate inputs for phase and amplitude control, so that separate signals must be provided anyhow.

Each inverter can contain a control unit with a free running clock, the frequency and phase of which can be influenced by the phase control channel only within certain limits. Thereby, each inverter can also be operated without phase control at its own rate, which is necessary, for instance, if one inverter is to take over frequency control.

One lead interter can determine the frequency of the bus bar voltage; in this lead inverter, the phase reference voltage is then a voltage with constant frequency and in the other inverters, the phase reference voltage is the bus bar voltage. Through this simple measure, any desired inverter can take over the frequency control of the bus bar voltage, so that the parallel connected inverters are not dependent on a reference source.

In a lead inverter, which determines the frequency of the bus bar voltage, the frequency and phase of the clock generator in the control unit can remain uninfluenced, while in the other inverters, the phase reference voltage is the bus bar voltage. Thereby, inverters which have separate phase and amplitude control channels and contain a free running clock generator, can be used simply as frequency controlling inverters.

A lead inverter can determine the amplitude of the bus bar voltage; the amplitude reference voltage is then a voltage with constant amplitude in this lead inverter, and in the other inverters, the bus bar voltage is the amplitude reference voltage. Thereby, any desired inverter can take over the amplitude control of the bus bar voltage and the other inverters are controlled at the amplitude of the output voltage after this lead inverter.

Advantageously, each inverter is assigned a ranking, whereof the inverters connected to the bus bar and operative, the inverter with the highest ranking is the lead inverter. It is determined thereby, which inverter takes control as the next one if the original leading inverter fails.

If the bus bar can be connected to a supply network, then the network line voltage can be used as the reference voltage for the phase control channel of all inverters, if the line voltage is present. Thereby, all inverters are synchronized with the network even if they are not yet connected to the latter, so that reconnection to the network is possible without a frequency and phase jump.

When finally the network is connected to the bus bar, the bus bar voltage can be the reference voltage in every inverter. Then the network takes over the voltage and frequency control.

The desired (reference) current can be determined in a computing circuit with the following equation:

$$I_{soll\ i} \text{(or } I_{ref\ i}) = \left( I_{ni} / \sum_{1}^{p} I_{ni} \right) \cdot I_S,$$

Where $I_s$ is the load current of the bus bar, $I_{ni}$ the nominal current of the inverter and the p the number of inverters connected to the bus bar. Thereby, a distribution of the load current in accordance with the nominal power rating of the inverters is obtained.

If a network is connected to the bus bar, the desired current can be determined in a computing circuit according to the following equation:

$$I_{soll\ i} = \left[ I_{ni} / \left( \sum_{1}^{p} I_{ni} + I_{ns} \right) \right] I_S,$$

where $I_{ns}$ is a share for the desired current of the network; the other variables are defined as above. Thus, the network also participates in the load current according to the share $I_{ns}$.

The amplitude of the reference voltage of the inverter can be reduced if the output current of this inverter exceeds a limit. With a decrease in the reference voltage, the output current of the respective inverter drops, so that effective current limitation is obtained.

The range of values of the output voltage of the amplitude control channel can be bounded by an upper and lower limit. This limits the output voltage of the inverter upward and downward. For starting up, an inverter which is not connected to the bus bar, it is then advantageous to adjust the upper limit, starting from zero, to a nominal value. Thus, the output voltage of the inverter increases, according to the adjustment of the upper limit, to its nominal value, starting with zero.

The apparatus for forming the simulated control variable is advantageously designed so that a current detector for the bus bar current is connected to the input of a multiplier circuit, the output of which is connected to the negative input of a summing stage; the positive input of the summing stage is connected to a current detector for the output current of the inverter; and that the output of the summing stage is followed by an amplifier with the gain $Z_x$, the output of which is connected to the first positive input of the summing stage, the second positive input of the summing stage being connected to a voltage detector for the inverter output voltage. This circuit arrangement represents a simple possibility for generating the simulated control variable. The multiplier circuit advantageously contains an operational amplifier, the inverting input of which is connected via a resistor to the input of the computing circuit, the non-inverting input of which is tied to ground, and the output of which is connected to the output of the multiplier circuit and which comprises between the output and the inverting input several series circuits, each of which consists of a feedback resistor and a semiconductor switch, and wherein the base of each semiconductor switch is connected to a signal input of the multiplier circuit. Thus, the multiplier circuit is realized by an operational amplifier with controlled feedback and gain.

The phase control channel advantageously contains a phase discriminator, the inputs of which are connected to the output of the computing circuit for forming the simulated control variable, or to the voltage detector for the phase reference voltage via square wave formers designed as controlled amplifiers, the output of the phase discriminator being connected via the phase control to the frequency control input of the control unit. This circuit arrangement represents a simple possibility for realizing the phase control channel.

For amplitude control, an amplitude control channel advantageously contains a summing stage, the positive input of which is connected to a voltage detector for the amplitude reference value, and the negative input of which is connected to the output of a computing circuit for forming the simulated control variable, the summing stage being followed by an amplitude control which is connected via a limiting device to the amplitude setting input of the control unit, wherein the limiting device comprises a first limiting input for limiting the minimum value, which is acted upon by a fixed voltage value, and a second limiting input for limiting the maximum value, which is connected to a starting generator designed as a function generator, and wherein the starting generator can be set to zero by a control signal to a control input. This circuit arrangement represents simple possibility for realizing the amplitude control channel.

For limiting the current, the control device can advantageously contain a current limited channel with a summing stage, where the negative input of the summing stage is connected via a rectifier and a smoothing filter to a current detector for the inverter output current, and the positive input of the summing stage is connected to a reference voltage source, and where the output of the summing stage is connected via a current limiting control and a diode to the negative input of a summing stage, at the positive input of which the reference voltage is present. With this circuit, current limitation of the inverter is achieved.

DETAILED DESCRIPTION OF THE INVENTION

Figure 1:
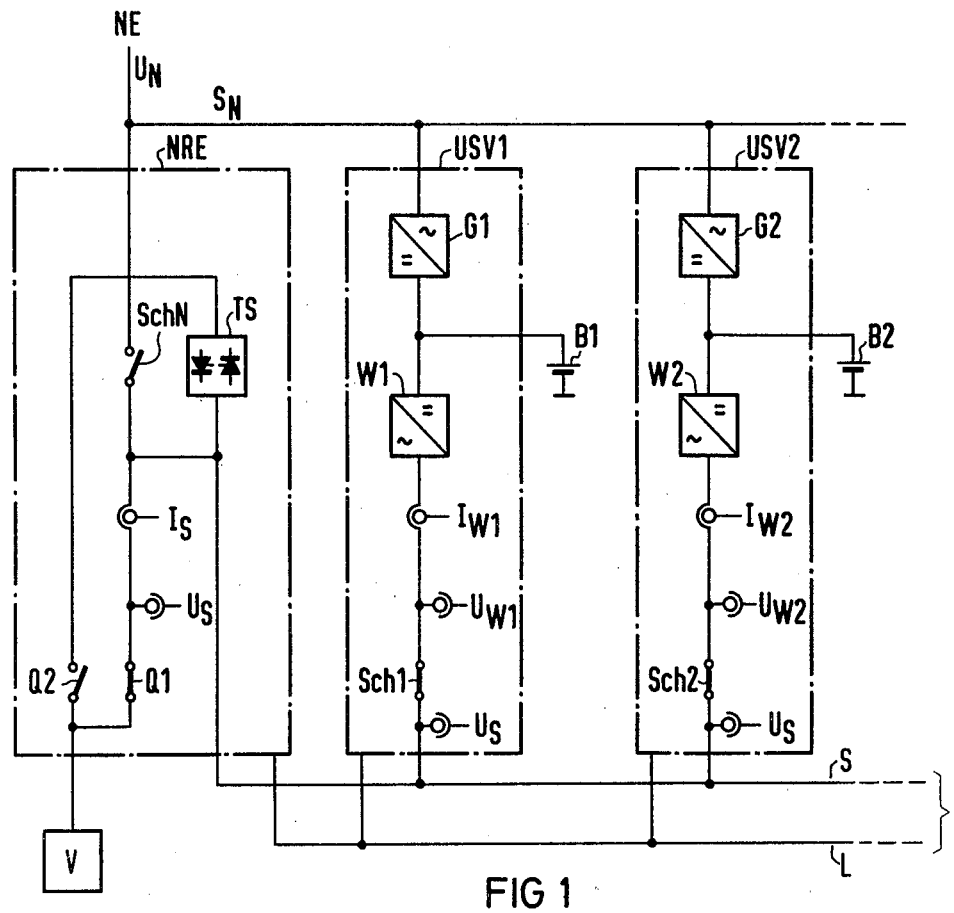
FIG. 1 is a block diagram of an interruption free power supply system.

To demonstrate the method according to the invention, FIG. 1 shows, in simplified form, the block diagram of a redundantly designed interruption free power supply system with two static converter units USV1, USV2, as well as a network reconnecting device NRE. From the network feed NE, several converter units are supplied via the system bus $S_N$; in the example of FIG. 1, two are shown, namely, USV1 and USV2. Each converter unit consists of a rectifier portion G and an inverter portion W. Between the rectifier G and the inverter W, a battery B is connected which is charged via the rectifier G and supplies the inverter W with energy if the network fails. All converters USV are connected via respective switches Sch to a bus bar S. Each inverter W can be connected and disconnected by the switch Sch. In each converter USV, the output current $I_W$ of the inverter W, the output voltage $U_W$ of the inverter W and the bus bar voltage $U_S$ are measured.

The load V can be supplied selectably via the switch Q2 directly from the network or via the switch Q1 from the bus bar S. In order to maintain the supply of the load V if converters USV fail, the bus bar S can be connected to the network via the switch SchN or the fast acting thyristor switch TS if the line voltage $U_N$ is sufficient. Connecting the bus bar S to the network NE is also possible for starting up the installation or for taking on loads which the converters alone would be unable to supply. In the network reconnecting devices NRE, the bus bar current $I_S$ and the bus bar voltage $U_S$ are measured. Status signals are interchanged between the network reconnecting device NRE and the converters USV via the line L which is redundant and error protected.

So that parallel operation of the inverters $W_i$ and reconnection to the network can be carried out, the inverters $W_i$ must be controlled so that amplitude and phase agree and can be brought into agreement with the network. If redundancy is required, no common control circuit must be used for controlling the individual inverters, since the latter would otherwise be dependent on a common member and the required redundancy would thus be broken. It is furthermore a disadvantage if analog signals, which are interference prone because of their necessarily low signal level, must be interchanged among the inverters. Less critical is the interchange of status reports, which change their signal level only occasionally and can be transmitted with great security against interference.

The problems described here with reference to an interruption free power supply system also arise in other installations with parallel connected inverters, for instance, in static converters which, contrary to the interruption free power supply installations, have no battery in the intermediate circuit, or in emergency power supplies, in which the load is supplied in the normal case via a network and only in case of a disturbance via inverters.

The control method chosen here is based on the fact that only status reports are interchanged among the individual inverters, while synchronization is accomplished via the bus bar S or the network bus bar $S_N$ which, as power components, are both very rugged and interference proof. If both bus bars were destroyed, the inverters could no longer be synchronized. This is without significance since the load cannot be supplied if the bus bar is destroyed. If all three phases are used for synchronizing, synchronization can be maintained if one phase fails.

Figure 2:
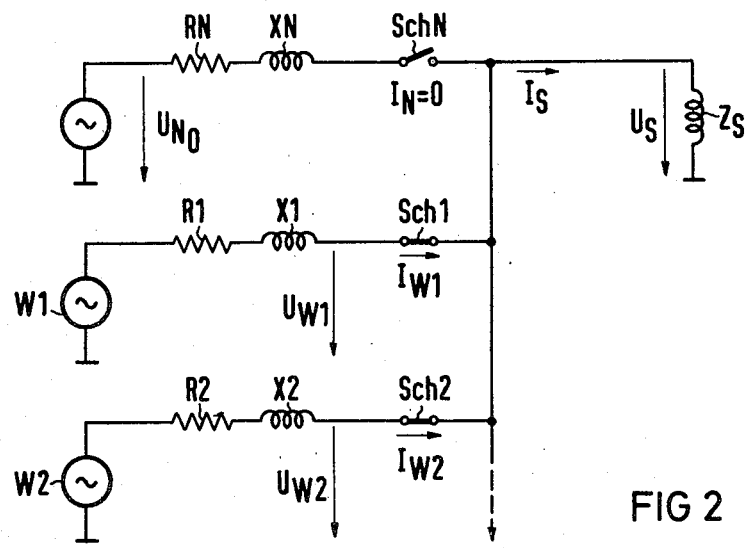
FIG. 2 illustrates the equivalent circuit of the interruption free power supply system of FIG. 1.

For deriving the control method, the equivalent circuit of the interruption free power supply according to FIG. 1 is shown in FIG. 2, which applied to the fundamentals of voltages and currents. It was assumed that the internal impedances of the network and the inverters are ohmic-inductive and linear. In the equivalent circuit according to FIG. 2, it was further assumed that the switch $Sch_N$ of the network reconnecting device NRE is not closed and the switches Sch1 and Sch2 of both inverters W1 and W2 are closed. The control method will be derived for the general case where p inverters are connected in parallel. The subscript "i" is introduced to identify each inverter and the associated measurement quantity.

In that case, there applies for all inverters $$U_S = U_{W1} = \ldots = U_{Wi} = \ldots = U_{Wp} \quad (1)$$

and also $$I_S = \sum_{i=1}^{p} I_{Wi} \quad (2)$$

In interruption free power supply systems, it is generally required that each one of the parallel connected inverters $W_i$ participate in the current supply according to its nominal power rating and therefore, to its nominal current $I_{ni}$. In order to meet this requirement, the following condition must be met:

$$I_{Wi} = I_{soll\ i} = \frac{I_{ni}}{\sum\limits_{1}^{p} I_{ni}} \cdot I_S \quad (3)$$

where $I_{ni}$ is the nominal current of the inverter under consideration and $$\sum_{1}^{p} I_{ni}$$

is the sum of the nominal currents of all inverters. We will introduce as an abbreviation:

$$\gamma_i = \frac{I_{ni}}{\sum\limits_{i=1}^{p} I_{ni}} \quad (4)$$

If an inverter deviates from its reference current $I_{soll\ i}$, then there applies instead of Eq. (3):

$$I_{Wi} = I_{soll\ i} + \Delta I_i = \gamma_i I_S + \Delta I_i \quad (5)$$

A control variable has now been found, by means of which the inverters $W_i$ can be synchronized among each other, and with which a defined load distribution can be ensured if inverters $W_i$ operate in parallel onto a bus bar S. This control variable is suitable for all operating conditions occuring in inverters $W_i$; for switching of the operating conditions, only reference values need to be changed, but no intervention into the controller itself is necessary. The output voltage $U_{Wi}$ of the inverter $W_i$ cannot be used as the control variable since it is equal to the bus bar voltage $U_S$ and thus does not contain sufficient information if the inverters are connected in parallel. For controlling each inverter $W_i$, a complex simulated control variable $U_{Wi}'$ is therefore chosen, which is composed as follows:

$$U_{Wi}' = U_{Wi} + \Delta I_i \cdot Z_{xi} \tag{6}$$

In principle, $Z_{xi}$ can be any desired impedance. As will be shown later, however, the maximum control rate is obtained if the real and the imaginary components of $Z_{xi}$ are proportional to the internal impedance $Z_i$ of the respective inverter. In the following, it will first be shown that with the simulated control variable $U_{Wi}'$, a defined load distribution among the inverters $W_i$ is obtained and synchronization of the inverters $W_i$ via the bus bar S is possible. Finally, it will be shown with the aid of the block diagram of a control device according to FIG. 4 that with the simulated control variable $U_{Wi}'$ described, adaption to different operating conditions is possible by switching reference values.

It is assumed, first, that all inverters $W_i$ considered are connected to the bus bar S, no connection existing between the bus bar and the network. It is further assumed that all inverters have the same reference value $U_{soll}$, to which the simulated control variable $U_{wi}'$ of each inverter is regulated. In the stabilized condition, we then have:

$$U_{Wi}' = U_{soll} \tag{7}$$

By substituting Eqs. (1) and (7) in Eq. (6) one obtains:

$$\Delta I_i = \frac{U_{soll} - U_S}{Z_{xi}} \tag{8}$$

By summing over all p inverters, one obtains:

$$\sum_{i=1}^{p} \Delta I_i = (U_{soll} - U_S) \cdot Y_x \tag{9}$$

where $$Y_x = \sum_{i=1}^{p} \left(\frac{1}{Z_{xi}}\right) \tag{10}$$

From Eqs. (2), (3), (4) and (5) one obtains by summing over all p inverters:

$$\sum_{1}^{p} \Delta I_i = \sum_{1}^{p} I_{Wi} - I_S \cdot \sum_{1}^{p} \gamma_i = 0 \tag{11}$$

Since $Z_x' \neq 0$, Eqs. (9) and (11) hold simultaneously only if:

$$U_{soll} - U_S = 0 \tag{12}$$

In the balanced condition, the bus bar voltage $U_S$ agrees with the common reference voltage $U_{soll}$ of the inverters $W_i$. From Eqs. (8) and (12), one also obtains:

$$\Delta I_i = 0 \tag{13}$$

According to the definition of $I_i$, this means that the desired load distribution of the inverters is reached. At the same time, the voltage of the bus bar is regulated to a predetermined value.

It is now assumed in the following that in addition to the inverters $W_i$, newtork NE is connected parallel to the bus bar S. Then we have instead of Eq. (2):

$$I_S = \sum_{i=1}^{p} I_{Wi} + I_N \tag{14}$$

$$U_{No} = U_S + I_N \cdot Z_N \tag{15}$$

$$I_N = \frac{U_{No} - U_S}{Z_N} \tag{16}$$

where $Z_N$ is the internal impedance and $U_{No}$ the no-load voltage of the network. Eqs. (7) to (9) remain valid when the network is connected in parallel, but instead of Eq. (11), we have:

$$\sum_{1}^{p} \Delta I_i = -I_N \tag{17}$$

If Eqs. (9) and (17) are set equal, one obtains with Eq. (16):

$$U_S = \frac{U_{No} + U_{soll} \cdot Z_N \cdot Y_x}{1 + Z_N \cdot Y_x} \tag{18}$$

As an abbreviation, the relative deviation $\beta$ of the network voltage $U_{No}$ from the reference value $U_{soll}$ is introduced:

$$U_{No} = (1+\beta) \cdot U_{soll} \tag{19}$$

Therewith, Eq. (18) becomes:

$$U_S = \frac{1 + \beta + Z_N \cdot Y_x}{1 + Z_N \cdot Y_x} \cdot U_{soll} \tag{20}$$

and Eq. (8) becomes:

$$\Delta I_i = -\frac{\beta}{1 + Z_N \cdot Y_x} \cdot I_{Ki} \tag{21}$$

where $I_{ki}$ is the short-circuit current of the inverter considered:

$$I_{Ki} = \frac{U_{soll}}{Z_i} \tag{22}$$

In general, the internal impedance $Z_N$ of the network can be ignored against the internal impedance $Z_i$ of the inverters; $Z_N$ of the network can then be assumed as zero. In this case one obtains:

$$U_S(Z_N=0) = (1+\beta) \cdot U_{soll} = U_{No} \tag{23}$$

$$\Delta I_i(Z_N=0) = -\beta \cdot I_{Ki} \tag{24}$$

For the special case that the network voltage $U_N$ agrees with the reference value $U_{soll}$, i.e., for $\beta=0$, one obtains:

$$U_S(\beta=0) = U_{soll} \tag{25}$$

$$\Delta I_i(\beta=0) = 0 \tag{26}$$

Thus, it has been shown that with the described simulated control variable $U_{Wi}$, a stable and defined load distribution is ensured if the bus bar S is operated in parallel with the network NE. In general, the network impedance is so small compared to the internal impedance of the inverters $W_i$, that the network voltage for all practical purposes determines the voltage $U_S$ of the bus bar S. The smaller the response of the network on the bus bar S is, the smaller the relative deviation of the network voltage from the common reference value $U_{soll}$ of the inverters. It must be noted here, of course, that the inverter current $I_{Wi}$, which is composed of the load current and the additional equalization current with the network, must not exceed the maximally permissible current.

The current distribution of the inverters $W_i$ can be determined by a choice of the corresponding weighting factor $65_i$, which enters into the desired (reference) current $I_{soll\ i}$. If, for instance, an inverter $W_l$ is not to participate in supplying the bus bar S, then the weighting factor $\gamma l=0$ is chosen for this inverter $W_l$. The weighting factors of the other inverters are chosen according to Eq. (4) as follows:

$$\gamma i = \frac{I_{ni}}{\sum_{i=2}^{p} I_{Ni}} \quad (2 \leq i \leq p) \tag{27}$$

For the inverter $W_l$ one obtains from Eq. (5):

$$I_{Wl} = \Delta I_l \tag{28}$$

If the network is not connected to the bus bar, one obtains from Eqs. (8), (13) and (28), if the voltage reference value $U_{soll}$ of all inverters is the same:

$$I_{Wl} = 0 \tag{29}$$

As Eq. (29) shows, by approximately choosing $\gamma_i$, the inverter $W_l$ will no longer participate in supplying the bus bar and the remaining inverters $W_i$ will take over correspondingly larger currents instead. If, on the other hand, the bus bar S is operated parallel to the network NE, $\gamma_l$ is set 0 and the other weighting factors $\gamma_i$ are chosen as per Eq. (27). It follows that:

$$I_{Wl} = \Delta I_l = -\frac{\beta}{1 + Z_N \cdot Y_x} \cdot I_{Kl} \tag{30}$$

For parallel operation of the bus bar S with the network NE, the inverter $W_l$ provided with the weighting factor $\gamma_l=0$ and therefore takes on no load, but carries only the equalization current caused by the deviation of the network voltage $U_{No}$ from the reference value $U_{soll}$. The inverters $W_i$ participating in the feeding of the bus bar $S_s$ must therefore take over a correspondingly larger share of the bus bar current $I_S$. For operation of the bus bar with the network, the reference value $U_{soll}$ is chosen equal to the bus bar voltage $U_S$. No equalization currents between the inverters $W_i$ and the network NE occur. In that case, it follows from Eqs. (16) and (18) that:

$$U_S = U_{soll} = U_{No} \tag{31}$$

$$I_N = 0 \tag{32}$$

As will be shown in the following, one obtains a particular advantage for redundant parallel operation of the inverters with synchronization via the bus bar S without separate synchronizing lines. It is achieved by choosing the bus bar voltage $U_S$ as the reference voltage $U_{soll}$ at least for the phase control. This bus bar voltage is controlled for frequency and phase by the network or by a lead inverter $W_i$ in a manner which will be explained later in connection with FIG. 4.

By choosing the bus bar voltage $U_S$ as the reference voltage $U_{soll}$, one obtains in the stabilized condition with Eqs. (6) and (7):

$$U_{soll} = U_S = U_{Wi} \tag{33}$$

$$U_{Wi}' = U_{Wi} + \Delta I_i \times Z_{xi} = U_{Wi} \tag{34}$$

With the method described, the inverters $W_I$ are thus synchronized among each other via the bus bar S if the bus bar voltage $U_S$ is chosen as the reference voltage $U_{soll}$ where the maintenance of the voltage of the bus bar S is not affected and a defined load distribution is achieved among the parallel connected inverters $W_i$.

Figure 3:
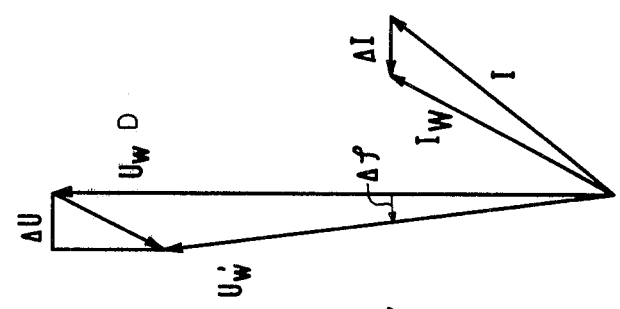
FIG. 3 illustrates vector diagrams of the simulated control variable.
Figure 3:
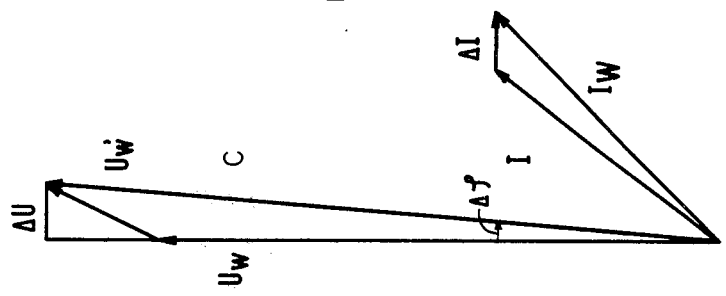
Figure 3:
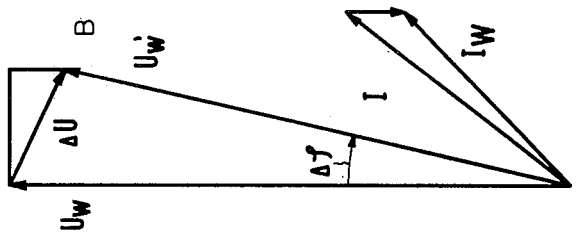
Figure 3:
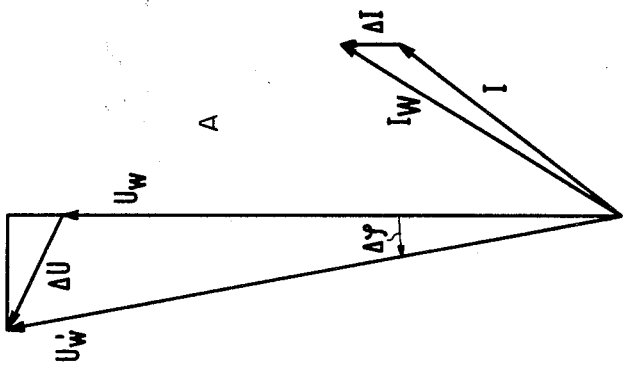

In FIG. 3, vector diagrams of the simulated control variable $U_{Wi}$, are shown for different deviations of the inverter current $I_W$ from the desired current $I_{soll}$ with the bus bar voltage $U_S$ as the reference voltage $U_{soll}$. For all vector diagrams it is assumed that the inverters are loaded with the nominal current the $\cos \Delta\phi = 0.8$. For greater clarity, the voltage deviations $\Delta U$ are shown about 10 times larger than in actuality. It is further assumed that the network NE is not connected to the bus bar S. Therewith, the simulated control variable $U_{wi}$ therefore agrees in the stabilized condition, according to Eq. (34), with the inverter voltage $U_{wi}$:

$$U_{Wi}' = U_{Wi} \tag{35}$$

Vector diagram A shows an operating case with an active current deviation $\Delta I$ from the reference value $I_{soll}$ of 20%; vector diagram B an active current deviation $\Delta I$ of +20%, vector diagram C, an inductive current deviation $\Delta I$ of +20% and the vector diagram D, an inductive current deviation $\Delta I$ of −20%. As the examples indicate, the action of amplitude and angle controls is necessary to balance out the assumed errors. It is then found that an optimum control characteristic is obtained if the real and the imaginary components of $Z_x$ are proportional to the real and the imaginary components of the internal impedance $Z_i$ of the inverter under consideration. In that case, the active and the reactive component of the current deviation are detected with their mutual ratio and control is accomplished via the shortest path, i.e., with the greatest speed. If the complex impedance $Z_{xi}$ is chosen differently, the active and the reactive component of the current deviation $\Delta I$ are weighted incorrectly relative to each other, so that the control acts too strongly in one direction. For equilibrium, agreement is obtained of $U_{Wi}$ with $U_{soll}$, it was not obtained via the shortest path. Instabilities can arise if, in an inverter which has an inductive internal impedance $Z_i$, the impedance $Z_{xi}$ is chosen with an inductive component. In that case, phase control would first act in the wrong direction.

In the vector diagrams according to FIG. 3, the case was shown that the bus bar voltage $U_S$ is used for amplitude control as well as for phase control as the reference value $U_{soll}$. In inverters $W_i$ with separate amplitude and phase control channels, one can employ for the amplitude control channel an internal constant voltage source of each inverter $W_i$ for forming the amplitude reference voltage for the phase control channel. The voltages of the constant voltage sources of the individual inverters $W_i$ can be brought into agreement so accurately that a reference value $U_{soll}$ is obtained which is practically the same for all inverters $W_i$. In the case mentioned, synchronization is accomplished via the bus bar S, not amplitude control. This has the advantage that the bus bar voltage $U_S$ can be held more constant. For, if the bus bar voltage $U_S$ is used as the amplitude reference voltage, it must be smoothed in order to eliminate disturbances, implying a reduction of the control speed. If internal constant voltage sources are used, on the other hand, for forming the amplitude reference voltage, smoothing is not necessary. An existing smoothing device has no disturbing effect because of the constant value of the amplitude reference voltage.

Figure 4:
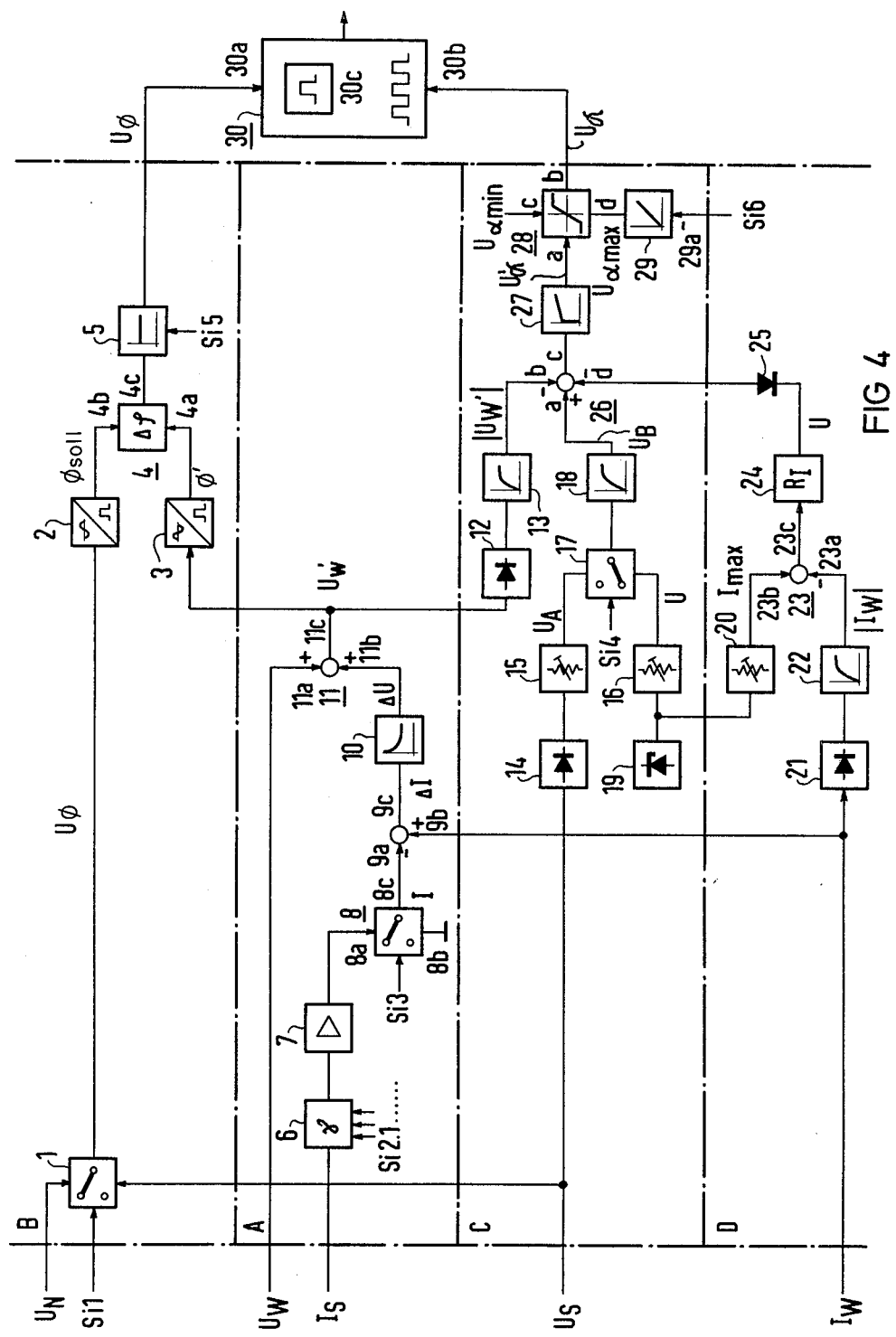
FIG. 4 is a block diagram of the control circuit of the system of FIG. 1.

After this general derivation of the control method, the block diagram of a control system is shown in FIG. 4, which operates in accordance with the control method described. It is assumed that all inverters have the same reference value $U_{soll}$, so that in the stabilized state, the simulated control variable $U_{wi}'$, according to Eq. (7), agrees with the reference value $U_{soll}$ for amplitude and phase angle. Control is split into separate amplitude and phase controls, since the control unit of an inverter as a rule has separate control inputs for amplitude and frequency or phase. One therefore obtains two control channels, of which one processes only the amplitude and the other only the phase angle of the simulated control variable $U_{wi}'$. A d-c voltage suffices for the amplitude channel, which is derived either from a d-c reference voltage or from a rectified a-c voltage. As the reference value for the phase channel, an a-c voltage of any waveform and amplitude and, in addition, a squarewave voltage can be used.

The processing of the actual values of the control is shown in the block diagram according to FIG. 4 as single phase, but can, of course, also be executed three phase. To simplify the notation, the subscript "i" has been omitted in FIG. 4 for all variables.

The control circuit according to FIG. 4 can be subdivided into four functional groups; namely, the computing circuit A for forming the simulated control variable $U_{wi}'$, the phase control channel B, the amplitude control channel C and the current limiter channel D. In the computing circuit A, the bus bar current $I_S$ is first multiplied in the multiplier circuit 6 by the factor $\gamma$ according to Eq. (4). For this purpose, information regarding the switching states of the other inverters $W_i$ must be fed to the multiplier circuit 6. This information is exchanged among the inverters $W_i$ in a redundant error protected manner. The multiplier circuit is shown later by way of an example, referring to FIG. 5.

To form $\Delta I$, the signals $I_S$ and $I_W$ must have the same scale. The multiplier circuit 6 is followed by an adapter section 7, the gain of which is chosen so that $\Delta I$ meets the conditions mentioned. The output of the adapter section 7 is connected via double throw contact 8a of the double throw switch 8, the second switch contact of which, 8b, is tied to zero potential. The double throw switch 8 is controlled by the signal Si3, the function of which will be explained later. The signal $I_{soll\,i}$, present at the output 8c of the double throw switch i corresponds, depending on the level of the signal Si3, to the output signal of the adapter stage 7 or to a zero signal, and is connected to the negative input 9a of the summing stage 9. To the positive input of the summing state 9, the current signal $I_W$ is applied, which represents the actual value of the output current of the inverter $W_i$. The difference $\Delta I$, present at the output 9c of the summing stage 9, of the output current $I_{Wi}$ of the inverter $W_i$ and the reference value $I_{soll\,i}$ of the inverter $W_i$ is multiplied in the amplifier circuit 10 by transfer function $Z_x$, which is proportional to the internal impedance $Z_i$ of the inverter $W_i$ for both real and the imaginary components. The amplifier circuit 10 is therefore an impedance simulation of the internal inverter impedance $Z_i$. Therefore at the output of the amplifier circuit 10 is the voltage deviation $\Delta U = \Delta I \cdot Z_x$ which is added, according to Eq. (6) in the summing circuit 11, to the output voltage $U_W$ of the inverter. At the output 11c of the summing stage 11, the desired simulated control variable $U_W'$ is therefore present. The latter is then used as the actual value for the phase control channel B and the amplitude control channel C.

The simulated control variable $U_W'$ is transformed in the squarewave former 3 of the phase control channel B into a squarewave voltage $\phi'$, the edges of which coincide with the zero crossings of $U_W'$. This squarewave voltage $\phi_{soll}$ is fed to the input 4a of the angle discriminator 4. To the second input 4b of the angle discriminator 4, a second sequence of squarewave signals $\phi'$ is fed as a phase reference value. Either the network voltage $U_N$ or the bus bar voltage $U_S$ can be used for forming the signal $\phi_{soll}$. For this purpose, a double throw switch 1 is provided which is controlled by a signal Si1 to be explained later. The output signal of the double throw switch 1 is fed to a second squarewave former 2, which forms from this signal a squarewave voltage $\phi_{soll}$, the edges of which coincide with the zero crossings of $U_N$ or $U_S$, respectively. This signal represents the mentioned reference value $\phi_{soll}$. The phase discriminator 4 compares the phase of $\phi_{soll}$ and $\phi'$, the output 4c of the phase discriminator 4 being connected to the input 5a of the angle controller 5, which may, for instance, be a proportional controller. At the output of the angle controller 5 is the control voltage $U_\phi$, which corresponds in magnitude and sign to the prevailing phase deviation $\Delta\phi$. The latter is fed to the frequency setting input 30a of the control unit 30 of the inverter W. The control unit 30 contains a frequency stabilized clock generator 30c, the frequency of which can be varied by the control input 30a only within certain limits. With internally timed operation of the inverter W, the phase controller 5 can be blocked, i.e., set to zero, at the input 5c by the control signal Si5. The clock generator 30c of the control unit 30 then oscillates freely with the internally predetermined frequency.

In the control channel C for the amplitude control, the magnitude of the simulated control variable $U_W'$ is compared with an amplitude reference value $U_{Bsoll}$. The reference value $U_{Bsoll}$ of the amplitude control system can be switched via the double throw switch 17, controlled by the signal Si4 between the voltages $U_A$ and $U_{ref}$ as desired. The voltage $U_A$ is generated via the rectifier 14 and a voltage divider 15 provided for matching the voltage from the bus bar voltage $U_S$. The voltage $U_{ref}$ is obtained from the constant voltage source 19 via a voltage divider 16. The double throw switch 17 is followed by a smoothing stage 18 which serves to suppress the ripple of the voltage $U_A$ and to prevent reference voltage jumps when switching from $U_A$ to $U_{ref}$ and back. At the output of the smoothing stage 18, a smoothed amplitude reference value $U_{Bsoll}$ is therefore available which, controlled by the signal Si4, is obtained from an internal constant voltage source 19 of the bus bar voltage $U_S$.

This amplitude reference value $U_{Bsoll}$ is now compared in the summing stage 26 with the absolute value $|U_W'|$ of the simulated control variable $U_W'$, where $U_{Bsoll}$ is fed to the positive input of the summing stage 26 and $U_W'$ to the negative input. The absolute value $|U_W'|$ is generated by a rectifier 12 and a smoothing section 13 connected thereto. The control deviation $U_{Bsoll}-|U_W'|$ is therefore present at the output c of the summing stage 16. From this, the amplitude controller 27 forms a voltage $U_\alpha'$, which is limited in the succeeding limiting stage in the range $U_{\alpha min}<U_\alpha'<U_{\alpha max}$. This amplitude controller 27 may, for instance, be a proportional integral controller. the voltage limits $U_{\alpha min}$ and $U_{\alpha max}$ are fed to the limiter 28 via the inputs 28c and 28d. At the output, 28b of the limiter 28, a control voltage $U_\alpha$ is present, which is fed to the amplitude setting input 30b of the control unit 30. When the limit voltage $U_{\alpha min}$ is fixed, the voltage limit $U_{\alpha max}$ is furnished by the start-up generator 29. The latter can be set to zero via the input 29a by the control signal Si6 at the start of the inverter $W_i$ and then runs up to its normal operating value.

The current $I_W$ of the inverter $W_i$ can be limited by a current limiting device D, which acts on the negative input 26d of the summing stage 26, to a maximum value $I_{max}$. The maximum value $I_{max}$ is obtained by a voltage divider 20 from the constant voltage source 19. From the inverter current $I_W$, the rectified actual value $|I_W|$ of the inverter current $I_W$ is obtained by rectification by the rectifier 21, and smoothing by the smoothing filter 22 connected thereto. The rectified inverter current $|I_W|$ is compared in a summing stage 23 with the maximum current $I_{max}$, where $I_{max}$ is fed to the positive input 23b, and $|I_W|$ is fed to the negative input 23a of the summing stage 23. The control deviation $I_{max}-|I_W|$ formed in the summing stage 23 is converted by the current controller 24 into a voltage $U_{zus}$. The output 24b of the current controller is connected via a diode 25 to the negative input 26d of the summing stage 26. The voltage $U_{zus}$ is positive as long as $I_{max}$ is larger than $I_W$. The diode 25 is poled so that the positive voltage $U_{zus}$ is blocked. If $U_{zus}$ becomes negative, the current controller 24 acts via the diode 25, now poled in the conduction direction, on the summing stage 26. This lowers the positive reference value $U_{soll}$, which in turn reduces the inverter current $I_W$. When the inverter current $I_W$ has dropped to the maximum value $I_{max}$, the system is at equilibrium. In practice, the maximum values $I_{max}$ of parallel operating inverters will be set proportional to their normal current. Since the current distribution of the inverter currents $I_W$ is proportional to their nominal current, the current limiting of all inverters begins almost simultaneously. The defined current distribution of the inverters is then preserved due to the influence of $\Delta I_W$ in the simulated control variable $U_W'$ also current limited.

By the control signals Si1 to Si6, control can be brought into different operating states independent of the system's operating condition. To form the control signals Si1 to Si6, each inverter $W_i$ contains its own process control (not shown). The most important operating states will be explained with reference to the Table on page 27. In the Table, the logic state of the signals Si1 to Si6 according to FIG. 4 is shown as a function of the system condition, where it is assumed that the positions of the double throw switches shown in FIG. 4 always refer to the signal level "L". In addition, the logic state of the signals Si1 and Si3 to Si6 are determined arbitrarily so that all signal levels are "L" if the inverters $W_i$ are operated in parallel with the network present. Parallel operation of the inverters $W_i$ with the network present corresponds to the normal operating condition of the system. The signals Si2.1 to Si2.p correspond to the switch positions of the inverter switches Sch1 to Schp, i.e., they indicate which inverters $W_i$ are connected to the bus bar S. For these signals, the "L" signal corresponds to the normal operating state, i.e., if all inverters are connected in parallel and operate with load, all the signals Si2.1 to Si2.p are at "L".

To set an inverter in operation, the latter is first brought into the starting position which is designated with No. 1 in the Table and is independent of the system's condition. To this end, the reference current $I_{soll}$ is set to zero by the signal Si3 via the double throw switch 8, i.e., the inverter $W_i$ is controlled so that it delivers no output current. The signal S4 is at "L" level, i.e., the amplitude reference voltage $U_{Bsoll}$ is obtained from the internal constant voltage source 19. However, the output voltage $U_W$ of the inverter $W_i$ is initially kept at zero, since the signal Si6 is at "H" potential and the starting-up generator 29 is thereby held at zero, so that the limiter 28 sets the signal $U_{60}$ to zero. The signal Si5 is at "H" level, i.e., the phase controller 5 is switched off and the clock generator 30c in the control unit 30 oscillates at the internally predetermined frequency.

The operating state "starting position" is therefore characterized in that the inverter $W_i$ has the output voltage $U_W=0$ and the clock generator 30c is free running, i.e., there is no synchronization.

TABLE

| No. | Operating Condition | Si1 | Si2.1 to Si2.p | Si3 | Si4 | Si5 | Si6 |
|---|---|---|---|---|---|---|---|
| 1 | Starting position (any network condition) | X+ | X | H | L | H | H |
| 2 | Voltage start-up (any network condition) | X | X | H | L | H | L |
| 3 | Adaptation to bus bar and parallel operation without load (network present) | L | X | H | H | L | L |
| 4 | Parallel operation with load (network present) | L | depending on system cond'n | L | L | L | L |
| 5 | Adaptation to bus bar and parallel operation without load (network not present) | H | X | H | H | L | L |
| 6 | Parallel operation with load (network not present internal clock) | X | depending on system cond'n | L | L | H | L |
| 7 | Parallel operation with load (network not present, externally controlled | H | depending on system cond'n | L | L | L | L |

TABLE-continued

| No. | Operating Condition | Si1 | Si2.1 to Si2.p | Si3 | Si4 | Si5 | Si6 |
|---|---|---|---|---|---|---|---|
| | internal clock) | | | | | | |

+X = state arbitrary

With the network NE of the other inverters $W_i1$, the signal levels of the signal Si1 and of the signals Si2.1 to Si2.p are arbitrary.

To build up the output voltage $U_W$ of the inverter $W_i$, the process control is switched to the operating condition "Voltage start-up", which differs from the starting position in that the signal Si6 is set to "L", so that the limiting signal $U_{amax}$ increases. Thereby, the reference voltage $U_{soll}$, which in this operating state corresponds to the reference voltage $U_{ref}$ comes into play. Since $I_{soll}$ is set to zero as before and the inverter $W_i$ is not connected to the bus bar S, so that $I_W$ is zero, the value zero is obtained for $\Delta I$. The simulated control variable $U_W$, is therefore identical with the inverter voltage $U_W'$, which is compared with the reference voltage $U_{ref}$ as the desired voltage $U_{soll}$. The inverter voltage $U_W$ is thus brought into agreement with reference voltage $U_{ref}$.

To adapt the inverter $W_i$ to the bus bar S and parallel operation without load and with the network present, the control signal Si1 is switched to "L" level, i.e., the phase reference value $\phi_{soll}$ is obtained via the double throw switch 1 from the network voltage $U_N$. At the same time, the signal Si5 is set to "L", i.e., the phase controller 5 is switched on. The inverter $W_i$ is therefore synchronized with the network. In the computing circuit A for forming the simulated control variable $U_W'$, the reference value $I_{soll}$ remains at zero. With no load and the inverter output current $I_W$ at zero, the simulated control variable $U_W'$ continues to be identical with the inverter voltage $U_W$. In the amplitude control channel B, however, the signal Si4 is switched to "H", so that the voltage $U_S$ of the bus bar S is utilized for forming the amplitude reference value $U_{Bsoll}$. The inverter voltage $U_W$ is therefore controlled to the voltage value $U_S$ of the bus bar S. In this condition, the inverter W is switched to the bus bar S.

In the operating condition "Parallel operation with load, with the network present", the phase is controlled according to the network as in the operating condition described before. To form the simulated control variable $U_W'$, however, the voltage deviation $\Delta U$ is added to the inverter voltage $U_W$. For this purpose, the signal Si3 is set to "L", so that the summing stage 9 is fed the reference value $I_{soll}$ calculated in the multiplier stage 6. For this purpose it is necessary that the signals Si2.1 to Si2.p for the multiplier stage 6 correspond to the switch positions of the inverter switches Sch1 to Schp. The simulated control variable $U_W'$ is composed in this case of the inverter voltage $U_W$, which agrees with the bus bar voltage $U_S$, and the product of the current deviation $\Delta I$ and $Z_x$. The simulated control variable $U_W''$ is compared in the amplitude control device C with the reference voltage $U_{ref}$ as the desired amplitude value $U_{Bsoll}$ since the signal S4 is at "L".

In the operating conditions described so far, "adaption to bus bar and parallel operation without load" and "Parallel operation with load", it has been assumed that the network is intact. In these cases, synchronization is established via the network bus bar $S_N$, to which, according to FIG. 1, each inverter $W_i$ is connected via a rectifier G, with the network voltage to make a reconnection to the network NE if inverters are disturbed or the power of the inverters is no longer sufficient for the load. However, the voltage of the inverters is regulated for the reference voltage $U_{ref}$, which is the same for each inverter $W_i$, and not for the network, as otherwise, voltage fluctuations of the network would be transmitted to the inverters.

If the network fails, the process control of each inverter must detect this and change the operating states accordingly. In the operating condition "Adaptation to bus bar and parallel operation without load", only the signal Si1 must be set to "H" in operation with network failure as compared to operation with the network present, i.e., the bus bar voltage $U_S$ and not the network voltage $U_N$ is used as the synchronizing voltage in this case.

With a network failure, the network NE can no longer assume the control of the frequency. The frequency control must therefore be taken over by one of the inverters $W_i$. To this end, a certain ranking is assigned to each inverter $W_i$ in the process control, the operative inverter $W_i$ with the highest ranking assuming the frequency control. If the latter fails, this is recognized by the process control device and the inverter $W_i$ with the next-to-the highest ranking controls the frequency.

The frequency controlling inverter $W_i$ is distinguished by the fact that it is internally clocked, i.e., the signal Si5 is at "H" level. Thereby, the phase controller 5 of the internally clocked inverter is switched off and the clock generator 30c in the control unit 30 of this inverter $W_i$ is free running. The control signal Si1 is then arbitrary, since the phase reference value $\phi_{soll}$ is not evaluated. Otherwise, the signal levels already described in connection with the operating condition "Parallel operation with load, with the network present" apply. In parallel operation with load and the network not present, all inverters $W_i$ with the exception of the lead inverter are operated with the externally controlled clock, with signal states as per item 7 of the Table. The inverters with an externally controlled internal clock differ from inverters with internal clock in that the phase controller 5 is in operation and the phase reference value $\phi_{soll}$ is derived from the bus bar voltage because the signal Si1 is at "H" level. The inverters with the externally controlled internal clock are therefore synchronized by the bus bar voltage $U_S$, the frequency of the bus bar voltage $U_S$ being given by the inverter with the internally controlled clock.

In connection with the derivation of the control method, it was shown that the described control leads to a desired load distribution in parallel operation with the network. Then, it was assumed that no load current is taken over by the network. If desired, the take-over of a defined load current can be achieved if the weighting factor $\alpha$ in the multiplier circuit 6 is made smaller and the reference current $I_{soll}$ from the magnitude determined from Eq. (3) results, so that the sum total of all reference currents $I_{soll}$ is assumed by the network in the stabilized state.

Figure 5:
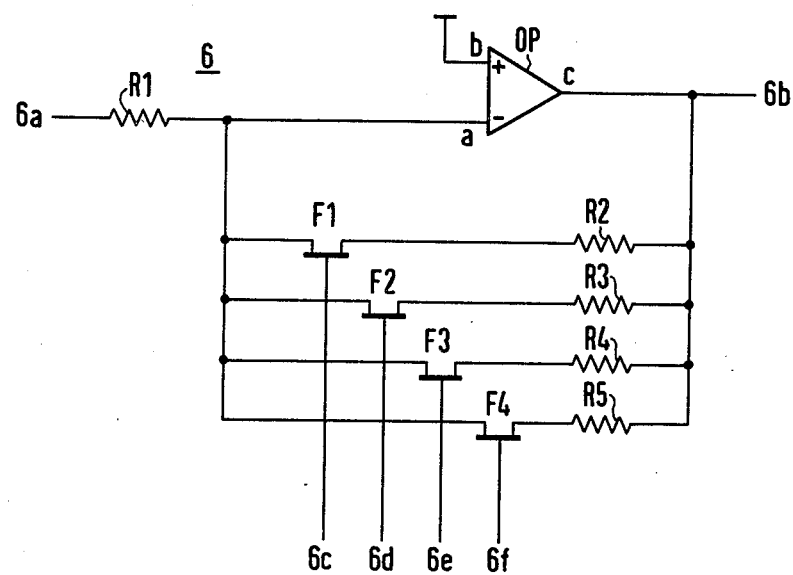
FIG. 5 is a circuit diagram of a multiplier circuit.

FIG. 5 shows in simplified form, the design of a multiplier stage 6, in the example having four control inputs 6c to 6f for four parallel connected inverters. The signal present at the input 6a is brought via the resistor R1 to the inverting input a of the operational amplifier OP, the noninverting input b of which is connected to ground. The signal can be taken off at the output c of the operational simplifier OP and is fed to the output 6b of the evaluating stage 6. The gain of the operational amplifier OP is determined by feedback. For this purpose, there are arranged between the input a of the operational amplifier and the output c, four series circuits, each consisting of a field effect transistor switch F1 to F4 and feedback resistor R2 to R5. The feedback resistors R2 and R5 become effective if the associated field effect transistor switch F1 to F4 is switched on by a signal at the associated signal input 6c to 6f. The gain of the multiplier state 6 therefore depends on the ratio of the resistance values of the switched on feedback resistors R2 to R5 to the resistance value of the resistor R1. The resistance values of the resistors R2 to R5 are chosen so that they correspond to the nominal currents of the inverters W1 to W4, and R1 is chosen corresponding to the nominal current of that inverter $W_i$, with which the multiplication circuit 6 is associated. By switching resistors R2 to R5 into the circuit with the signals 2.1 to 2.4 at the signal inputs 6c to 6f one thus obtains the correct current reference value $I_{soll}$ according to Eq. (3) as a function of the number of parallel operating inverters.

The double throw switches provided in the circuit according to FIG. 4 may be relays in the simplest case, but more advantageously, field effect transistor switches are used.

As squarewave formers 2 and 3, overdriven amplifiers, for instance, operational amplifiers without feedback, can be used.

The phase comparators 4 can be designed, for instance, as an integrator, which is started by the first pulse edge at the respective other input 4a or 4b. The output signal of the integrator thereby provides a measure for the phase difference between the pulse sequences at the inputs 4a and 4b.

The design and operation of control units are described in the book "Industrieelektronik" (Industrial Electronics) bu D. Ernst and D. Stroele, Springer-Verlag, Berlin 1973, pages 53 to 57.

With the control method and the circuit operating according to this method, it therefore becomes necessary to set all necessary operating states for the inverters W merely by switching the reference values for the control system, while the control circuits themselves need not be switched. Therefore no large control fluctuations occur when switching between the operating conditions. It is particularly advantageous that no analog signals are exchanged between the inverters in order to synchronize the inverters among themselves or with the network. Such a signal exchange has been found disturbance prone in practice. In the control system described, the synchronization takes place via the network bus or the bus bar as a rugged power connection which, if it fails, makes the power supply inoperative. Between the inverters, only state signals need be exchanged, which change their signal level only occasionally and which can be transmitted with great reliability via error protecting coding.

What is claimed is:

1. A method for controlling the voltage and the load distribution, as well as synchronizing several inverters, the outputs of which can be connected to a common bus bar, comprising:
   (a) forming a simulated control variable $U_{Wi}' = U_{Wi} + \Delta I_i \cdot Z_{xi}$ for each inverter; and
   (b) comparing the amplitude and phase of the simulated control variable $U_{wi}'$ with a reference voltage $U_{soll}$ which is the same for all inverters to develop a control command for controlling each inverter, where $U_{Wi}$ is the output voltage of the inverter ($W_i$), $\Delta I_i$ is the deviation of the output current $I_{Wi}$ of the inverter from a reference current $I_{soll\ i}$, and $Z_{xi}$ is a complex impedance.

2. The method according to claim 1, wherein for each inverter the real and the imaginary components of the complex impedance are proportional to the real and the imaginary component of the internal impedance of the inverter.

3. The method according to claim 1 for controlling several inverters with separate phase and amplitude control channels comprising splitting the reference voltage into an amplitude reference voltage and a phase reference voltage, and comparing, for each inverter, the phase and amplitude of the simulated control variable with the phase of the phase reference voltage, and with the amplitude of the amplitude control voltage in respective separate phase control and amplitude channels.

4. The method according to claim 3, where each inverter contains a control unit with a free running clock generator and further including controlling the frequency and phase of the clock generator only within certain limits using the phase control channel.

5. The method according to claim 1 for controlling several inverters with separate phase and amplitude control channels comprising splitting the reference voltage into an amplitude reference voltage and a phase reference voltage and, for each inverter, comparing the phase and the amplitude of the simulated control variable, in a phase control channel, with the phase of the phase reference voltage, and, in an amplitude control channel, with the amplitude of the amplitude reference voltage and wherein each inverter contains a control unit with a free running clock generator, the frequency and the phase of the clock generator coupled to be responsive to the phase control channel within certain limits and further comprising establishing one inverter as a lead inverter which determines the frequency of the bus bar voltage, and supplying said lead inverter with a phase reference voltage of constant frequency and, in the other inverters, using the bus bar voltage as the phase reference voltage.

6. The method according to claim 4, comprising establishing a lead inverter which determines the frequency of the bus bar voltage, coupling said lead inverter so that the frequency and phase of the clock generator in its control unit is independent of the phase control channel and, in the other inverters, using the bus bar voltage as the phase reference voltage.

7. The method according to claim 1 for controlling several inverters with separate phase and amplitude control channels comprising splitting the reference voltage into an amplitude reference voltage and a phase reference voltage and, for each inverter, comparing the phase and the amplitude of the simulated control variable, in a phase control channel, with the phase of the phase reference voltage, and, in an amplitude control channel, with the amplitude of the amplitude reference voltage and wherein each inverter contains a control unit with a free running clock generator, the frequency and the phase of the clock generator coupled to be responsive to the phase control channel within certain limits and further comprising establishing one inverter as a lead inverter which determines the frequency of the bus bar voltage, and supplying said lead inverter with a phase reference voltage of constant frequency and, in the other inverters, using the bus bar voltage as the phase reference voltage and using the lead inverter to determine the amplitude of the bus bar voltage by supplying to said lead inverter an amplitude reference voltage of constant magnitude, and, in the other inverters, using the bus bar voltage as the amplitude reference voltage.

8. The method according to claim 1 for controlling several inverters with separate phase and amplitude control channels comprising splitting the reference voltage into an amplitude reference voltage and a phase reference voltage and, for each inverter, comparing the phase and the amplitude of the simulated control variable, in a phase control channel, with the phase of the phase reference voltage, and, in an amplitude control channel, with the amplitude of the amplitude reference voltage and wherein each inverter contains a control unit with a free running clock generator, the frequency and the phase of the clock generator coupled to be responsive to the phase control channel within certain limits and further comprising establishing one inverter as a lead inverter which determines the frequency of the bus bar voltage, and supplying said lead inverter with a phase reference voltage of constant frequency and, in the other inverters, using the bus bar voltage as the phase reference voltage and using the lead inverter to determine the amplitude of the bus bar voltage by supplying to said lead inverter an amplitude reference voltage of constant magnitude, and, in the other inverters, using the bus bar voltage as the amplitude reference voltage, said step of establishing a lead inverter comprising assigning to each inverter a ranking and selecting as the lead inverter the one of the operable inverters connected to the bus bar with the highest ranking.

9. The method according to claim 3, wherein the bus bar is adapted to be connected to a network and further comprising using the network voltage as the phase reference value for the phase control channel of all inverters.

10. The method according to claim 1 wherein a network is connected to the bus bar, and further comprising using the bus bar voltage as the reference voltage in every inverter.

11. The method according to claim 1 for controlling several inverters with separate phase and amplitude control channels comprising splitting the reference voltage into an amplitude reference voltage and a phase reference voltage and, for each inverter, comparing the phase and the amplitude of the simulated control variable, in a phase control channel, with the phase of the phase reference voltage, and, in an amplitude control channel, with the amplitude of the amplitude reference voltage and wherein each inverter contains a control unit with a free running clock generator, the frequency and the phase of the clock generator coupled to be responsive to the phase control channel within certain limits and further comprising establishing one inverter as a lead inverter which determines the frequency of the bus bar voltage, and supplying said lead inverter with a phase reference voltage of constant frequency and, in the other inverters, using the bus bar voltage as the phase reference voltage and using the lead inverter to determine the amplitude of the bus bar voltage by supplying to said lead inverter an amplitude reference voltage of constant magnitude, and, in the other inverters, using the bus bar voltage as the amplitude reference voltage, said step of establishing a lead inverter comprising assigning to each inverter a ranking and selecting as the lead inverter the one of the operable inverters connected to the bus bar with the highest ranking and further comprising using the network voltage as the phase reference value for the phase control channel of all inverters and using the bus bar voltage as the reference voltage in every inverter and determining the reference current in a computing circuit in accordance with the following equation:

$$I_{soll\ i} = \frac{I_{ni}}{\sum_{1}^{p} I_{ni}} \cdot I_s$$

where $I_s$ is the load current of the bus bar, $I_{ni}$ the nominal current of the inverter and p the number of inverters connected to the bus bar.

12. The method according to claim 1 for controlling several inverters with separate phase and amplitude control channels comprising splitting the reference voltage into an amplitude reference voltage and a phase reference voltage and, for each inverter, comparing the phase and the amplitude of the simulated control variable, in a phase control channel, with the phase of the phase reference voltage, and, in an amplitude control channel, with the amplitude of the amplitude reference voltage and wherein each inverter contains a control unit with a free running clock generator, the frequency and the phase of the clock generator coupled to be responsive to the phase control channel within certain limits and further comprising establishing one inverter as a lead inverter which determines the frequency of the bus bar voltage, and supplying said lead inverter with a phase reference voltage of constant frequency and, in the other inverters, using the bus bar voltage as the phase reference voltage and using the lead inverter to determine the amplitude of the bus bar voltage by supplying to said lead inverter an amplitude reference voltage of constant magnitude, and, in the other inverters, using the bus bar voltage as the amplitude reference voltage, said step of establishing a lead inverter comprising assigning to each inverter a ranking and selecting as the lead inverter the one of the operable inverters connected to the bus bar with the highest ranking and further comprising using, the network voltage as the phase reference value for the phase control channel of all inverters and using the bus bar voltage as the reference voltage in every inverter and determining the reference current in a computing circuit in accordance with the following equation:

$$I_{soll\ i} = \frac{I_{ni}}{\sum_{1}^{p} I_{ni} + I_{ns}} \cdot I_s$$

where $I_s$ is the load current of the bus bar $I_{ni}$ the nominal current of the inverters, p the number of inverters connected to the bus bar and $I_{ns}$ a share for the reference current of the network.

13. The method according to claim 1 for controlling several inverters with separate phase and amplitude control channels comprising splitting the reference voltage into an amplitude reference voltage and a phase reference voltage and, for each inverter, comparing the phase and the amplitude of the simulated control variable, in a phase control channel, with the phase of the phase reference voltage, and, in an amplitude control channel, with the amplitude of the amplitude reference voltage and wherein each inverter contains a control unit with a free running clock generator, the frequency and the phase of the clock generator coupled to be responsive to the phase control channel within certain limits and further comprising establishing one inverter as a lead inverter which determines the frequency of the bus bar voltage, and supplying said lead inverter with a phase reference voltage of constant frequency and, in the other inverters, using the bus bar voltage as the phase reference voltage and using the lead inverter to determine the amplitude of the bus bar voltage by supplying to said lead inverter an amplitude reference voltage of constant magnitude, and, in the other inverters, using the bus bar voltage as the amplitude reference voltage, said step of establishing a lead inverter comprising assigning to each inverter a ranking and selecting as the lead inverter the one of the operable inverters connected to the bus bar with the highest ranking and further comprising using, the network voltage as the phase reference value for the phase control channel of all inverters and using the bus bar voltage as the reference voltage in every inverter and determining the reference current in a computing circuit in accordance with the following equation:

$$I_{soll\ i} = \frac{I_{ni}}{\sum_{1}^{p} I_{ni} + I_{ns}} \cdot I_s$$

where $I_s$ is the load current of the bus bar, $I_{ni}$ the nominal current of the inverters, p the number of inverters connected to the bus bar, and $I_{ns}$ a share for the reference current of the network and further including limiting the current of each of the inverters, such that the amplitude of the reference voltage of the inverter is reduced if the output current of said inverter exceeds a limit.

14. The method according to claim 13 and further including limiting the output voltage of the amplitude control channel as to its range of values by an upper and a lower limit.

15. The method according to claim 14, and further including when starting up an inverter not connected to the bus bar changing the upper limit beginning at zero, to a nominal value.

16. Apparatus for controlling the voltage and load distribution as well as synchronizing several inverters, the outputs of which can be connected to a common bus bar comprising:
(a) means for forming a simulated control variable $U_{Wi}' = U_{Wi} + \Delta I_i \cdot Z_{xi}$ for each inverter, and
(b) means for comparing the amplitude and phase of the simulated control variable $U_{Wi}'$ with a reference voltage $U_{soll}$ which is the same for all inverters to develop a command for controlling each inverter, where $U_{Wi}$ is the output voltage of inverter ($W_i$), $\Delta I_i$ is the deviation of the output current $I_{Wi}$ of the converter from a reference current $I_{soll\ i}$, and $Z_{xi}$ is a complex impedance.

17. Apparatus according to claim 16 wherein said means for forming the simulated control variable comprises:
(a) a first detector for the bus bar current;
(b) a multiplier circuit having the output of said first detector as an input;
(c) a summing stage having the output of said multiplier coupled to its negative input;

(d) a second current detector for the output current of the inverter coupled to positive input of said summing stage;
(e) an amplifier having as an input the output of said summing stage;
(f) a further summing stage having the output of said amplifier as a first positive input; and
(g) a voltage detector for the inverter voltage supplying its output as a second positive input to said further summing stage.

18. Apparatus according to claim 17 wherein said multiplier circuit comprises:
(a) an operational amplifier;
(b) a resistor coupling the inverting input of said amplifier to the multiplier circuit input, the noninverting input of said amplifier being connected to ground, and the output of said amplifier being connected to the output of said multiplier circuit; and
(c) a plurality of series circuits, each of which comprises a feedback resistor and a semiconductor switch having a switching input coupled between the said output and said inverting input, the switching input of each semiconductor switch coupled to a respective signal input of the multiplier circuit.

19. Apparatus according to claim 16 and further including means to split said reference voltage into an amplitude reference voltage and a phase reference voltage and wherein said means for comparing comprise a phase control channel and an amplitude control channel.

20. Apparatus according to claim 19 wherein said phase control channel comprises:
(a) a phase discriminator having an input coupled to the output of said means for forming the simulated control variable;
(b) a voltage detector for the phase reference voltage coupled to another input of said phase discriminator;
(c) squarewave formers in the form of over-driven amplifiers disposed at said phase discriminator inputs; and
(d) a phase controller having as an input the output of said phase discriminator and providing its output to a frequency control input of the control unit of its inverter.

21. Apparatus according to claim 19 wherein said amplitude control channel comprises:
(a) a summing stage;
(b) a voltage detector for the amplitude reference value coupled to the positive input of said summing stage;
(c) the negative input of said summing stage coupled to the output of said means for forming the simulated control variable;
(d) an amplitude controller coupled to the output of said summing stage;
(e) a limiting device coupling the output of said amplitude controller to an amplitude setting input of the control unit for the inverter;
(f) a fixed voltage source coupled to a first limiting input of said limiting device;
(g) a start-up generator in the form of a function generator for maximum value limiting coupled to a second limiting input of said limiting device; and
(h) a control input for setting said start-up generator to zero.

22. Apparatus according to claim 19 wherein said current limiting channel comprises:

(a) a current detector for the inverter output current;
(b) a summing stage;
(c) a rectifier and a smoothing filter coupling the output of said current detector to the negative input of said summing stage;
(d) a reference voltage source coupled to the positive input of said summing stage;
(e) a current limiting control having as its input the output of said summing stage;
(f) a further summing stage;
(g) a diode coupling the output of said current limiting control to the negative input of said further summing stage; and
(h) means coupling said reference voltage to the positive input of said further summing stage.

* * * * *